Aug. 9, 1966  R. HAINZ  3,264,868
TEST STAND FOR FUEL INJECTION PUMPS
Filed Feb. 18, 1963  3 Sheets-Sheet 2
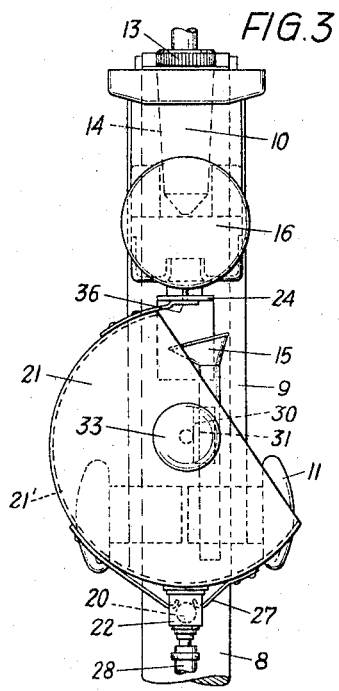
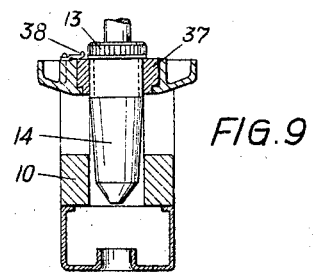
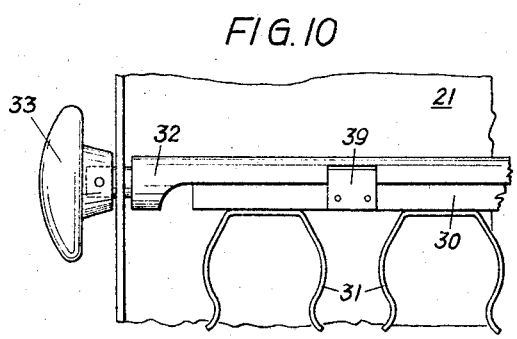
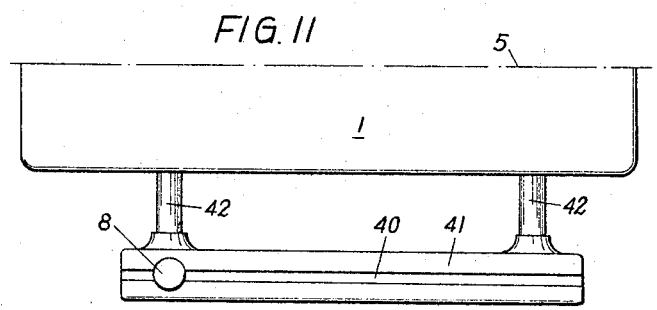
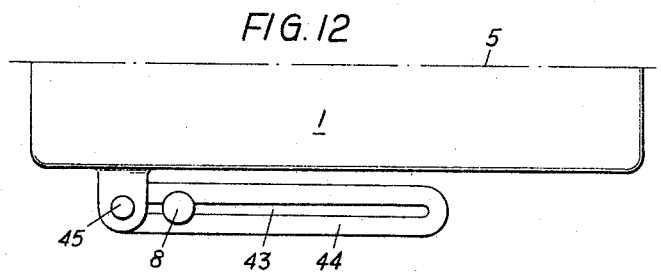

United States Patent Office 3,264,868
Patented August 9, 1966

3,264,868
TEST STAND FOR FUEL INJECTION PUMPS
Richard Hainz, Salzburg, Austria, assignor to
Friedmann & Maier, Salzburg, Austria
Filed Feb. 18, 1963, Ser. No. 259,209
Claims priority, application Austria, Feb. 28, 1962,
A 1,685/62
13 Claims. (Cl. 73—119)

Test stands for fuel injection pumps comprise a support device for the pump to be tested, a motor-driven driving spindle, which can be coupled to the shaft of the pump to be tested, a nozzle carrier, in which the nozzles and/or nozzle holders to be used in the test are inserted, and a carrier for the measuring glasses disposed below the nozzles. The nozzles carried by the nozzle carrier are connected by injection conduits to the outlets of the pump to be tested. Various measurements can be carried out on such test stands. During a capacity measurement, the fuel discharged during a certain number of strokes of the pump to be tested flows into the measuring glasses thereby enabling a check of the capacity. To avoid a distortion of the test result, the injection conduits from the outlets of the pump to be tested to the nozzles should not be too long. For this reason the nozzle carrier should be as close as possible to the pump to be tested. In addition, certain adjusting operations on the pump to be tested are required during the test. Hence, access to the pump to be tested should be as convenient as possible. Pumps are driven at the left or right end so that the lateral opening through which the various elements of the pump are accessible for adjustment and which opening is closed by a cover is disposed on one or the other side of the pump. For this reason, the pump must be accessible from both sides.

Pumps are built in various widths. To make the injection conduits on the test stand as short as possible, it has already been proposed that the nozzle carrier and the measuring glass carrier, which are disposed laterally of the pump to be tested, should be displaceable transversely to the axis of the pump. This enables an adaptation to various widths of the injection pump and in the case of a narrow injection pump, the nozzle carrier and the measuring glass carrier may be moved closer to the pump in order to keep the injection conduits short, and such a test stand can also be used for the widest injection pumps. The nozzle carrier and measuring glass carrier, however, are always disposed on the same side of the test stand so that during a test of an injection pump having the cover on that side on which the nozzle carrier and measuring glass carrier are disposed, access to the pump is most difficult. Only after the injection conduits have been disconnected can the nozzle carrier be laterally displaced to improve access to the cover side of the pump. It has also been proposed to provide for a vertical adjustment of the nozzle carrier and measuring glass carrier disposed on the side of the pump to be tested and enable these carriers to be fixed in their vertically adjusted position. While this enables an adaptation to injection pumps of different heights, access to that side of the pump on which the nozzle carrier and measuring glass carrier are disposed remains obstructed. In these known arrangements, it is not contemplated to raise the nozzle carrier and the measuring glass carrier to such a high level that the pump becomes accessible below these carriers. If this were attempted, the length of the injection conduits would become excessive. In one of these known arrangements in which the pump to be tested is driven by hand, the entire test bench with the fixing plate for the pump and the nozzle carrier and the measuring glass carrier is pivotally movable about a vertical axis. This serves only, however, to save the operator the walk to the other side of the test stand but access to the pump is not improved because the nozzle carrier and the measuring glass carrier remains on the same side of the injection pump in all angular positions. Moreover, such an arrangement is not applicable to motor-driven test stands.

To enable the testing of injection pumps driven from the left and right ends, it has already been proposed to pivot the nozzle carrier and measuring glass carrier to the test bench so that they can be selectively moved to the left or right side of the pump to be tested. This pivotal movement is not possible when the pump has been fixed in position because in these known arrangements the nozzle carrier and the measuring glass carrier are not vertically adjustable so that they cannot be raised above the pump during their pivotal movement. Furthermore, such a pivotal movement of the nozzle carrier and the measuring glass carrier during the testing operation would require a disconnection of the injection conduits. Hence, in these known arrangements, the pump remains accessible only from one side whereas there are cases in which an access from both sides is required. Injection pumps are tested together with the governor and an adjustment of the governor requires in many cases an access from the other side. All these cases involved difficult, time-consuming work, for instance, with the aid of angular screwdrivers. If in such case the nozzle carrier and measuring glass carrier are on such a high level that the pump remains accessible from both sides, there is again the disadvantage of long injection conduits.

Other test stands are known in which the nozzle carrier and the measuring glass carrier are not disposed on the side but frontally over the headstock of the test stand. While in this case the pump to be tested is accessible from both sides, the disadvantage of long injection conduits must be tolerated in all cases in these arrangements even if the design of the pump would permit an inherently more convenient positioning of the nozzle carrier and measuring glass carrier on the side of the pump. Another disadvantage of this arrangement is the fact that a frontal observation of the measuring glasses is possible only throughout the length of the test stand or from the side, and in which case the operator must bend over the test stand, which is very inconvenient.

It is an object of the invention to avoid these disadvantages of the known test stands. The invention resides essentially in that the nozzle carrier and the measuring glass carrier are arranged to be vertically adjustable and are pivotally movable in a horizontal direction relative to the support device and driving spindle. Thus, the invention enables the selection of that position of the nozzle carrier and measuring glass carrier which is most favorable for the pump to be tested. Because the nozzle carrier and the measuring glass carrier are arranged to be vertically adjustable and also pivotally movable in a horizontal direction, an adaptation to pumps of various heights is possible and the nozzle carrier and measuring glass carrier can be adjusted to a lateral position with respect to the pump as well as to a frontal position, for instance, above the driving spindle, and a relative large length of the injection conduits need only be tolerated in those cases in which a lateral arrangement of the nozzle carrier and measuring glass carrier is prohibited or unsuitable in view of the design of the pump. According to the invention, the angle through which the nozzle carrier and the measuring glass carrier are pivotally movable is at least 180°, preferably even 270°. Hence, the design according to the invention enables the nozzle carrier and measuring glass carrier to be swung out so that the working area for fixing the pump is fully exposed. If the angle of the pivotal movement is 270°, the nozzle carrier and measuring glass carrier may even be swung back as far as the side wall of the headstock of the test stand so that there is elbowroom on the test bench on both sides during the fixing of the pump.

In a preferred embodiment of the invention, the arrangement is such that the nozzle carrier and measuring glass carrier are vertically adjustable and pivotally mounted on a vertical, cylindrical column. This results in a simple and stable structure. In this case, the nozzle carrier and measuring glass carrier may be axially supported by a vertically adjustable clamping ring, which is clamped to the column at the desired level thereby enabling a pivotal movement on any level without requiring any effort. The column may be mounted on the test stand so as to be adjustable at right angles to the axis of the column. An adjustment transversely to the axis of the driving spindle will not only enable an adaptation to various widths of the pump to be tested but also an arrangement on the right or left side of the driving spindle, as may be desired. An adjustment in the direction of the axis of the driving spindle will enable an adaptation to different lengths of the pump or its driving shaft.

Special advantages are afforded by an embodiment of the invention in which the measuring glass carrier is pivotally movable relative to the nozzle carrier about a vertical axis disposed at one of the ends of the measuring glass carrier. This may be the same axis about which the nozzle carrier is pivotally movable, such as for instance, the column. Preferably, however, the pivot of the measuring glass carrier is carried by the nozzle carrier. In the position for operation during testing, the measuring glasses must be disposed below the nozzles because the fuel jet must enter the measuring glasses from the nozzles or the jet damping devices which are usually provided. The measuring glass carrier may be held by a detent, particularly a resilient detent in this position, and in which the measuring glass carrier registers with the nozzle carrier in a plan view. In the intervals between successive testing operations, however, the measuring glass carrier can be swung outwardly independently of the nozzle carrier which is held in position by the injection conduits screwed thereto. An access to the pump to be tested is thus enabled also from the side where the nozzle carrier is disposed and access to and reading of the measuring glasses are facilitated. With this pivoted arrangement of the measuring glass carrier on the nozzle carrier, access to the pump is enabled in most cases by a single manipulation without need for disconnecting the injection conduits, which in connected condition prevent a pivotal movement of the nozzle carrier. In an advantageous embodiment of the invention the measuring glass carrier is rotatable through at least 180° about a vertical axis disposed at the center of the measuring glass carrier, and suitably about the vertical axis of symmetry of the points where the fuel jets impinge in the row of measuring glasses. This may be provided for in a simple manner in that the pivot of the measuring glass carrier is not directly connected to the measuring glass carrier but the latter is mounted for rotation about its central axis on a pivoted bracket. In this case the measuring glass carrier may be held in those positions in which it is parallel to the bracket, i.e., in the operative positions, by detents such as resilient detents, which cooperate with the bracket. The rotatability about the central axis of the measuring glass carrier affords the advantage that the measuring glass carrier can be moved after each measuring operation into the optimum position for reading the result of the measurement. This is particularly favorable if the nozzle carrier and measuring glass carrier are frontally disposed above the driving spindle and transversely to the same since in this case the measuring glass carrier may simply be swung through 90° for a reading from the side. When the nozzle carrier and measuring glass carrier are laterally disposed, the rotatability of the measuring glass carrier about its central axis will also facilitate the reading. An arrangement of the central axis of rotation in the axis of symmetry of the points where the fuel jets impinge in the row of measuring glasses will afford the additional advantage that the fuel jets will enter the measuring glasses exactly in the same manner in both positions spaced 180° apart. In this case, a pump in which the number of outlets is one half or less than one half the number of measuring glasses in the row of measuring glasses can be subjected to two tests by a rotation of the measuring glass carrier through 180° without need for emptying the measuring glasses between the tests. The results of the two tests can then be directly compared for performing the test more quickly. This also enables such an arrangement of the row of measuring glasses during the test that reading side faces of the injection pump or faces away from the injection pump, as may be desired by the operator for a more convenient reading.

Under the measuring glasses, a collecting trough must be provided into which the measuring glasses are emptied and from which the fuel flows back into the tank. To enable the provision of such a trough in a simple manner in conjunction with the pivoted and rotatable mounting of the measuring glass carrier, the arrangement may be such that the measuring glass carrier is formed by the collecting trough, with the bracket constituting a discharge conduit and the pivot means disposed in the central axis of the measuring glass carrier comprises a hollow pivot pin which is connected to the lowermost point of the collecting trough.

When the nozzle carrier is positioned laterally of the pump to be tested and in a frontal position, in which it extends transversely to the axis of the pump, the nozzle carrier will face the pump with different sides so that the injection conduits must be connected to two different sides of the nozzle carrier. To eliminate the need for rotating each nozzle holder in the nozzle carrier, the invention contemplates the mounting of the nozzle holders with the nozzles and, if desired, with the usually provided jet damping devices in a frame which has lateral symmetry and which is removably connected to the nozzle carrier, preferably by a quick-action connector. In this case, the frame with the nozzle holders is simply re-set so that all nozzle holders will be in the correct position. Even the injection conduits may remain on the nozzle holders because differently bent injection conduits are required in the lateral and frontal positions, respectively.

Hence, the invention as a whole provides a universally applicable test stand, in which in all modes of operation the work of adjusting the pump to be tested and reading the result of the measurement is simplified and minimized.

Embodiments of the invention are diagrammatically shown by way of example on the drawing.

FIG. 3 is an elevational view looking in the direction of the arrow III in FIG. 2.

FIG. 9 is a fragmentary vertical sectional view of the nozzles of the nozzle carrier.

FIG. 10 is a fragmentary view of an embodiment in which the measuring glass holder is replaceably mounted, and FIGS. 11 and 12 are views illustrating two modifications of the adjustable arrangement of the column.

Figure 1:
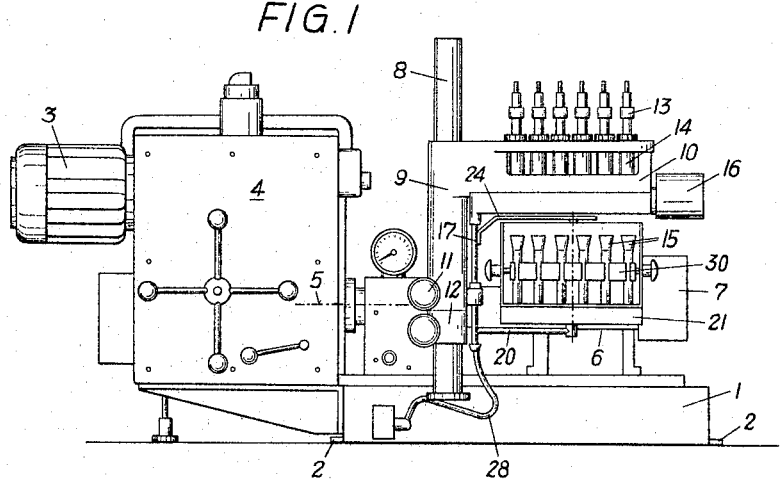
FIG. 1 is a side elevation showing the test stand.
Figure 2:
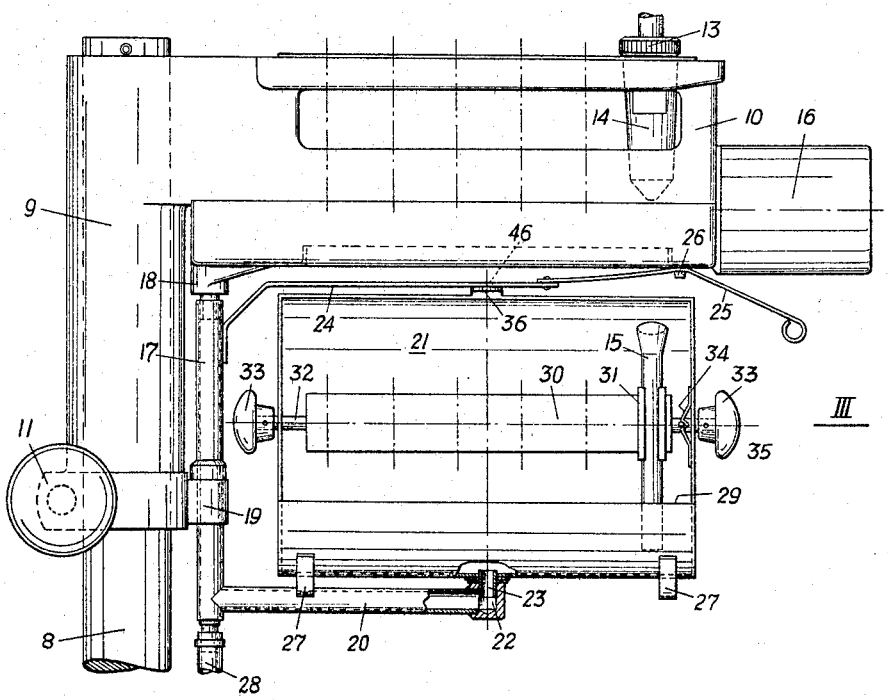
FIG. 2 is a view in side elevation and on an enlarged scale of the nozzle carrier and measuring carrier.

The test stand is shown in FIGS. 1, 2 and 3. 1 is a support plate of the test stand. This plate has lateral eyes 2 for threadedly connecting the plate to a workbench. 3 is the drive motor, 4 the gearbox for the drive and 5 the axis of the driving spindle. Governor 7 of pump 6 to be tested is shown on the right in FIG. 1 and only the lower edge of the pump 6 is visible. The upper edge of the pump is lower than the lower edge of nozzle carrier 10 and is covered by a measuring glass carrier 21.

A vertical cylindrical column 8 is fixed to the support plate 1 near one side of the latter. The nozzle carrier 10 provided with a guide sleeve 9 is pivotally and vertically slidably mounted on the column 8 and can be fixed in position by a clamping screw 11 acting on the guide sleeve 9. To facilitate a pivotal movement of the nozzle carrier 10 at any level, a clamping ring 12 is slidably mounted on the column 8 and can be clamped in position thereto to provide an axial support for the guide sleeve 9. Nozzle holders 13 serving for the test are screwed to the nozzle carrier 10. The injection conduits which connect the outlets of the pump to be tested to the nozzle holders 13 are not shown. 14 are jet damping devices and from which the fuel jet flows into measuring glasses 15 during the test. 16 is a known electromagnetic stroke-counting switchgear, which interrupts the supply of fuel from the jet damping devices 14 to the measuring glasses 15 after a predetermined number of strokes. According to the invention, this stroke-counting switchgear is carried by the nozzle carrier.

The measuring glass carrier is disposed below the nozzle carrier and pivotally movable about the axis of a shaft 17. The shaft 17 is mounted at its upper end in a bearing eye 18 of the nozzle carrier and at its lower end in a bearing eye 19 of the guide sleeve 9. Because the guide sleeve 9 forms a part of the nozzle carrier 10, the measuring glass carrier is thus pivoted to the nozzle carrier. The shaft 17 has an arm 20 on the end of which the measuring glass carrier 21 is rotatably mounted by means of a pivot pin 23 received by a bearing bore 22 of the arm 20. The shaft 17 comprises a second arm 24, which engages the top of the measuring glass carrier 21 so that the latter is held by the arms 20 and 24 in the manner of a fork. A spring 25 riveted to the arm 24 has a hole in which a pin 26 of the nozzle carrier 10 is received to hold the elements 17, 20, 24 with the measuring glass carrier 21 in position for operation. When the spring 25 is depressed, the measuring glass carrier can be swung freely about the axis of the shaft 17. The arm 24 and the spring 25 are formed with holes passed through by the fuel jets emerging from the jet damping devices 14. The measuring glass carrier 21 is provided with springs 27 which engage the arm 20 to hold the measuring glass carrier 21 and to snap in when the latter is in position for operation.

The measuring glass carrier is formed by the collecting trough into which the measuring glasses are emptied. The pivot pin 23 is attached to the lowermost point of the collecting trough 21 and is hollow. The arm 20 is also tubular and forms the discharge conduit to which a hose 28 is connected, and which conducts the fuel back to the fuel tank. The pivot pin 23 is merely inserted into the bearing bore 22 and can be lifted out of the same. The collecting trough 21 has a lug 36 which carries a pivot pin 46 received by the arm 24.

The collecting trough 21 has the shape of a circular cylindrical shell which is cut open in front at 29 so that the measuring glasses 15 are freely accessible. The measuring glasses 15 are fixed with spring clips 31 to a holder 30 which is rotatable about a shaft 32 and held in position by a bolt 35 snapping into a spring detent 34. The shaft 32 has turning knobs 33 on the exterior thereof.

The shaft 32 is mounted in the axis of the cylindrical collecting trough 21 and cylindrical rear wall 21' of such trough prevents a splashing of the fuel when the measuring glasses are tilted about the axis of the shaft 32 in the counterclockwise direction in FIG. 3.

The axis of pivot pins 23, 46 forms the vertical axis of symmetry of the points where the fuel jets emerging from the jet damping devices 14 impinge in the row of measuring glasses. Hence, the measuring glass carrier or collecting trough 21 can be rotated from the position shown in the drawing through 180° about the axis of the pivot pin 23 and when it has thus been rotated, the fuel jets will impinge in the measuring glasses at the same points. In the embodiment shown by way of example in the drawing, six nozzle holders and six measuring glasses are provided. If a three-outlet injection pump, for instance is being tested, the injection conduits will be connected to the three nozzle holders shown on the right in FIG. 1 and the fuel will flow into the three measuring glasses 15 on the right during the first test. The measuring glass carrier 21 may then be rotated through 180° so that the left-hand one of the two spring detents 27 shown in the drawing engages the arm 20.

The measuring glasses 15 are not emptied now and the test is repeated, the fuel flowing into the three measuring glasses shown on the left in FIG. 1, which have been moved to the right side by a rotation of the measuring glass carrier 21. The reading opening 29 is now on the other side. In this way, two measurements can be performed in succession and the results of measurement can be directly compared.

FIGS. 4–8 show the most important different positions of the nozzle carrier and the measuring glass carrier. Again, 4 is the gearbox, 5 the driving spindle, 6 the pump to be tested and 8 the column.

Figure 4:
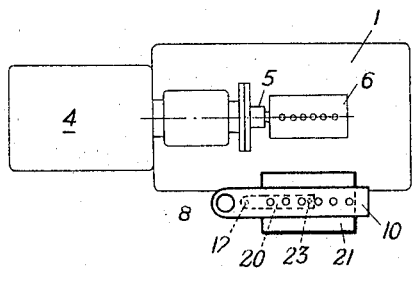
FIGS. 4–8 illustrate diagrammatically the essential different positions of the nozzle carrier and measuring glass carrier.
Figure 5:
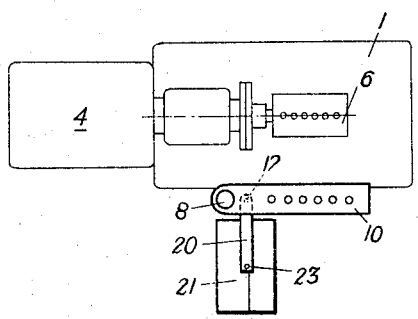

FIG. 4 shows the nozzle carrier 10 and measuring glass carrier 21 in a position for operation laterally of the pump to be tested. FIG. 5 shows the measuring glass carrier 21 swung out to enable access to the pump 6 from the side where the nozzle carrier 10 is disposed. The nozzle carrier 10 is held in position by the injection conduit.

Figure 6:
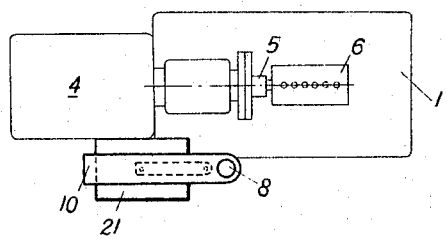

FIG. 6 shows a position in which the nozzle carrier 10 and the measuring glass carrier 21 have been swung back entirely to the gear box 4 so that the pump 6 is easily accessible from all sides when it is to be fixed to the support plate 1.

Figure 7:
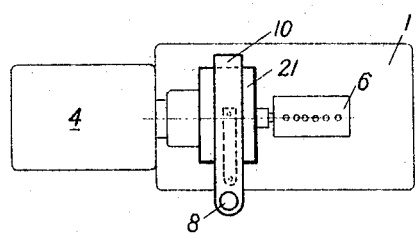
Figure 8:
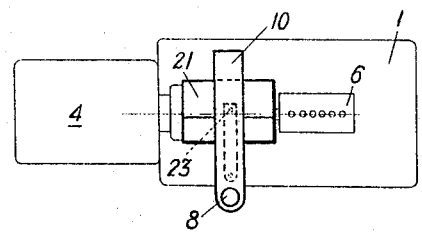

FIG. 7 shows the nozzle carrier 10 and measuring glass carrier 21 in a frontal position in which they extend transversely to the axis of the driving spindle and above which the measuring glass carrier 21 is disposed. FIG. 8 shows the same arrangement as FIG. 7 after a rotation of the measuring glass carrier 21 about its central axis 23, 46 to a position in which the reading of the result of measurement from the side is facilitated. In this case the nozzle carrier 10 is retained by the injection conduits in the position shown in FIG. 7.

FIG. 9 shows an embodiment in which all nozzle holders 13 and jet damping devices 14 are fixed in a common frame 37 which is merely inserted into the nozzle carrier 10 and retained by a quick-action connector, such as a rotatable spring clip 38. The frame 37 has lateral symmetry so that it can be inserted into the nozzle carrier 10 after a rotation through 180°. In the position shown in FIGS. 4 and 7, different sides of the nozzle carrier 10 face the pump 6. In the arrangement of FIG. 9, the frame 37 with all nozzle holders 13 can be turned through 180° and re-inserted by a single manipulation so that the connections for the fuel conduits are now directed towards the other side. Alternatively, the frame 37 with the nozzle holders 13 and the jet damping devices 14 may simply be replaced and the injection conduits required for a test in an arrangement as shown in FIG. 4 and for a test required in an arrangement as shown in FIG. 7 may be left on the nozzle holders. This may be desirable if there is a frequent need for testing pumps in alternation in arrangements as shown in FIG. 4 and FIG. 7.

FIG. 10 shows an arrangement with a replaceable holder 30, to which the measuring glasses are fixed with spring clips 31. The holder 30 is simply held with spring clips 39 on the shaft 32 so that all measuring glasses can be replaced by a single manipulation. This may be desirable when measuring glasses of different sizes are to be used or when the time required for a complete draining of the measuring glasses is to be saved.

FIG. 11 enables an adjustment of the column 8 relative to the support plate 1. The column 8 is clamped in a dovetail groove 40 of a beam 41. The beam 41 is slidable transversely to the support plate along two guides 42 and can be clamped in position.

FIG. 12 shows other means providing for an adjustment of the adjustable column 8. In this case, the column 8 is clamped in a dovetail groove 43 of a pivoted arm 44 which is pivotally movable about a pin 45 provided on the support plate 1 and can be fixed in different angular positions.

In FIGS. 11 and 12, 5 is the axis of the driving spindle. It is obvious that the guides 42 or the pivot 45 may be provided on both sides of the test stand so that the column 8 may be selectively arranged on the right or left side of the test stand.

The invention is not to be confined to any strict conformity to the showings in the drawings but changes and modifications may be made therein so long as such changes or modifications mark no material departure from the spirit and scope of the appended claims.

I claim:

1. A test stand for fuel injection pumps, comprising a fixedly arranged support device for the pump to be tested, a driving spindle, a gear box in which said driving spindle is mounted, said gear box mounted on said support device, said pump being coupled to the driving spindle, a first carrier, nozzles carried by the carrier, injection conduits operably connecting the nozzles to the outlets of the pump to be tested, a second carrier arranged below the nozzles, measuring glasses for receiving the amount of fuel to be tested supported by the second carrier, means attached to said support device for mounting said first and second carriers for pivotal movement in a horizontal plane, means for adjusting said first and second carriers vertically with respect to the support device, means for fixing said first and second carriers in position with respect to the support device, and means independent of said first-mentioned means for pivotally moving the second carrier relative to the first carrier for movement about a vertical axis.

2. The test stand as claimed in claim 1 in which said pivotally moving means includes a pivotal connection between said second carrier and first carrier.

3. The test stand as claimed in claim 2 in which detent means holds said second carrier in its operative position relative to the first carrier.

4. The test stand as claimed in claim 3 in which said detent means is a spring catch.

5. The test stand as claimed in claim 1 in which said pivotally moving means includes a pivotal connection between the second carrier and the first carrier and means providing rotation of the second carrier through at least 180° relative to the first carrier.

6. The test stand as claimed in claim 5 in which said second carrier is rotatably arranged about the vertical axis of symmetry of the points where the jets impinge in the measuring glasses.

7. The test stand as claimed in claim 1 in which said second carrier is mounted for rotation about a vertical axis on a bracket pivoted to the first carrier, said vertical axis being located in the middle portion of the second carrier.

8. The test stand as claimed in claim 7 including detent means cooperable with the bracket for holding the second carrier in positions parallel to the bracket.

9. The test stand as claimed in claim 8 in which said detent means is a spring catch.

10. The test stand as claimed in claim 1 in which said second carrier is mounted for rotation about the vertical axis on a bracket pivoted to the first carrier, said vertical axis being located in the middle portion of the second carrier, said second carrier being defined by a collecting trough into which the measuring glasses empty, with said bracket providing a discharge conduit and the pivot being defined by a hollow pin connected to the lowest point of the collecting trough.

11. The test stand as claimed in claim 10 in which the bracket is bifurcated and provided with a limb engageable with the second carrier from above and said limb having a bearing for a second pivot pin of said pivot.

12. The test stand as claimed in claim 1 in which said second carrier is mounted for rotation about the vertical axis on a bracket pivoted to the first carrier, said vertical axis being located in the middle portion of the second carrier, said second carrier being defined by a collecting trough into which the measuring glasses empty, with said bracket providing a discharge conduit and the pivot being defined by a hollow pin connected to the lowest point of the collecting trough and said collecting trough being constituted by a cylindrical shell having an open end and a closed end and about the axis of which the measuring glasses are tiltable to move the openings thereof toward the closed end of the shell.

13. The test stand as claimed in claim 12 including a horizontal tilting shaft rotatably mounted on said second carrier, a common replaceable holder in which the measuring glasses are arranged, and a connector for coupling the holder to the tilting shaft.

References Cited by the Examiner

UNITED STATES PATENTS 2,632,617  3/1953  Evans _____ 248—124

FOREIGN PATENTS 216,289  7/1961  Austria.
778,870  7/1957  Great Britain.
784,287  10/1957  Great Britain.
558,195  2/1957  Italy.
123,376  3/1962  Russia.

RICHARD C. QUEISSER, *Primary Examiner.*

DAVID SCHONBERG, *Examiner.*

J. J. SMITH, *Assistant Examiner.*